E. GASSMANN AND H. W. UHL.
MAGNETO ELECTRIC MACHINE.
APPLICATION FILED JULY 23, 1918.

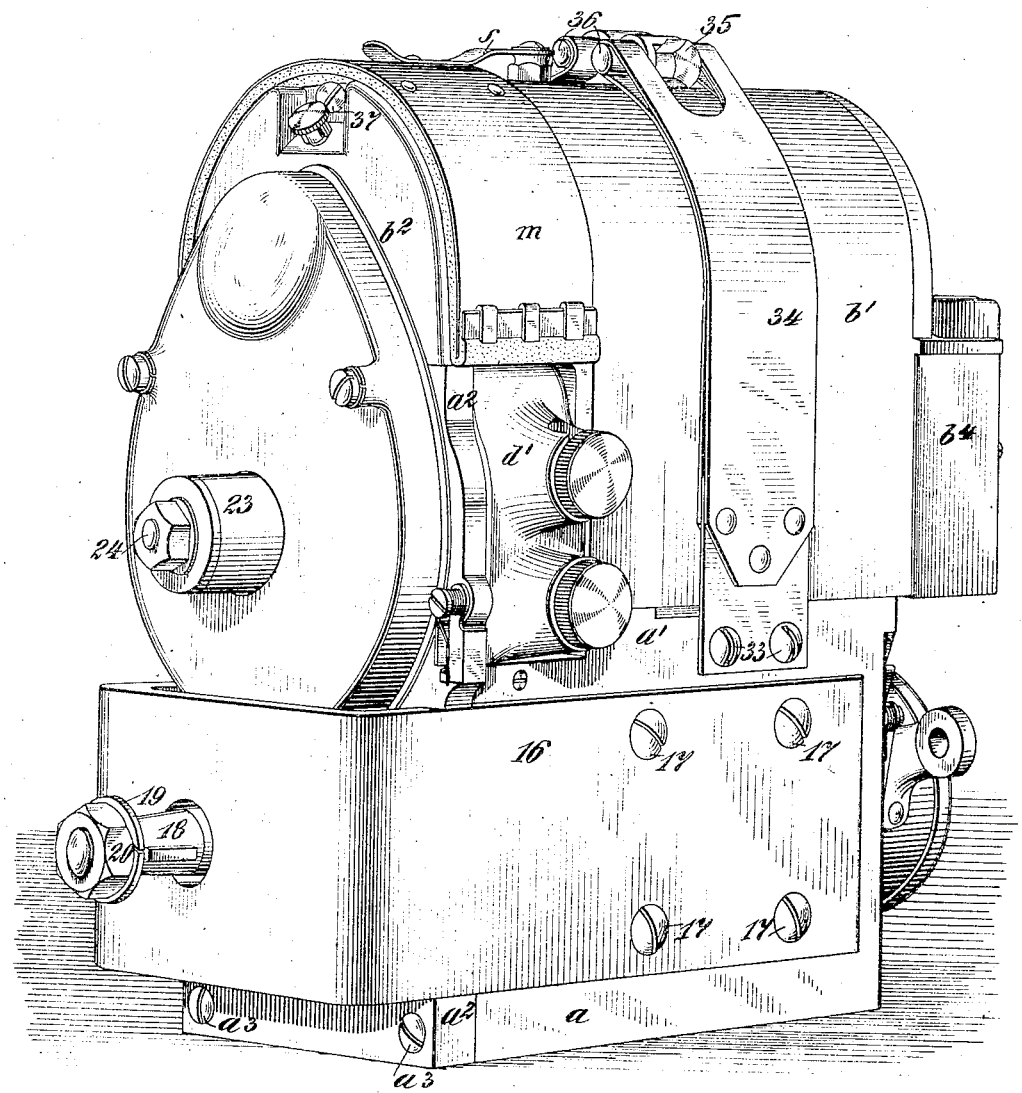

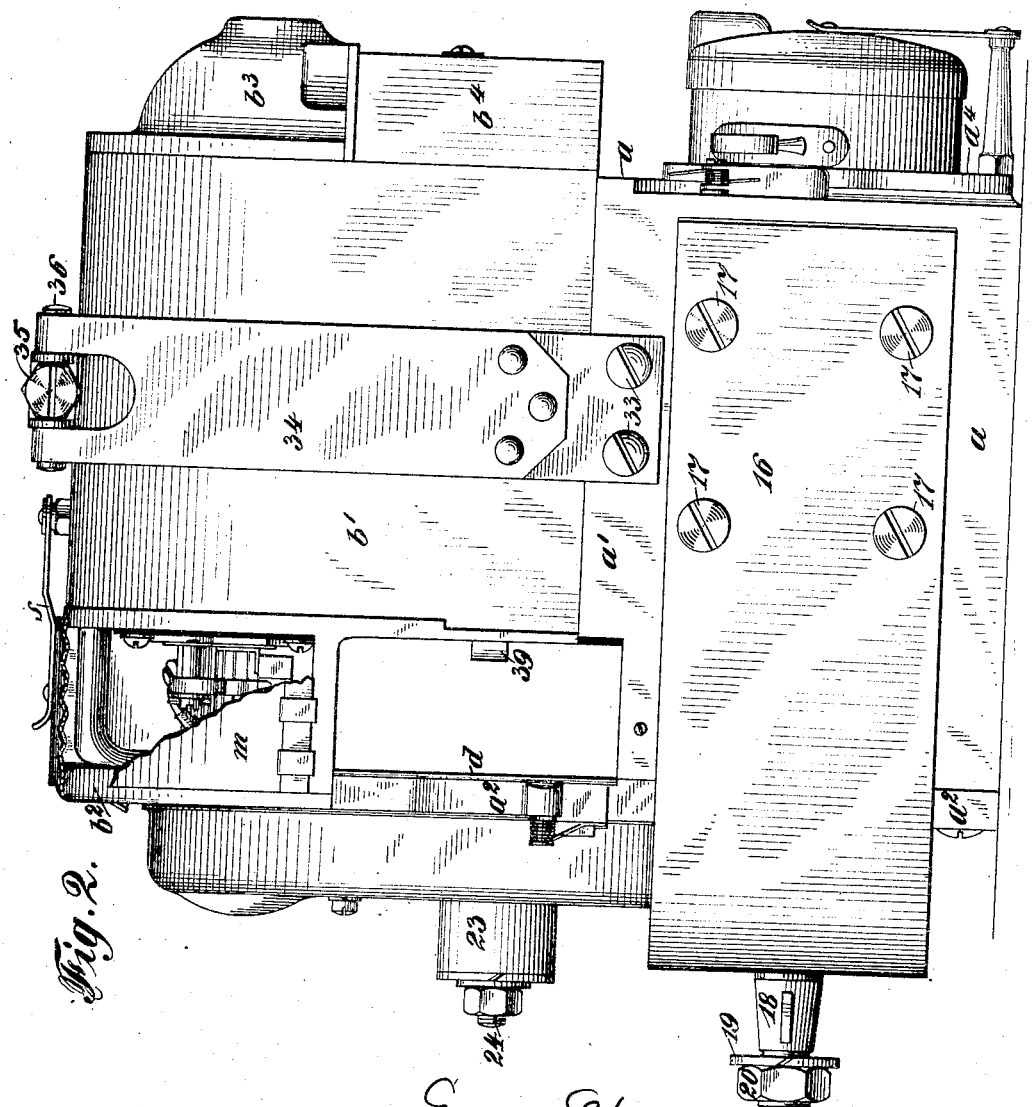

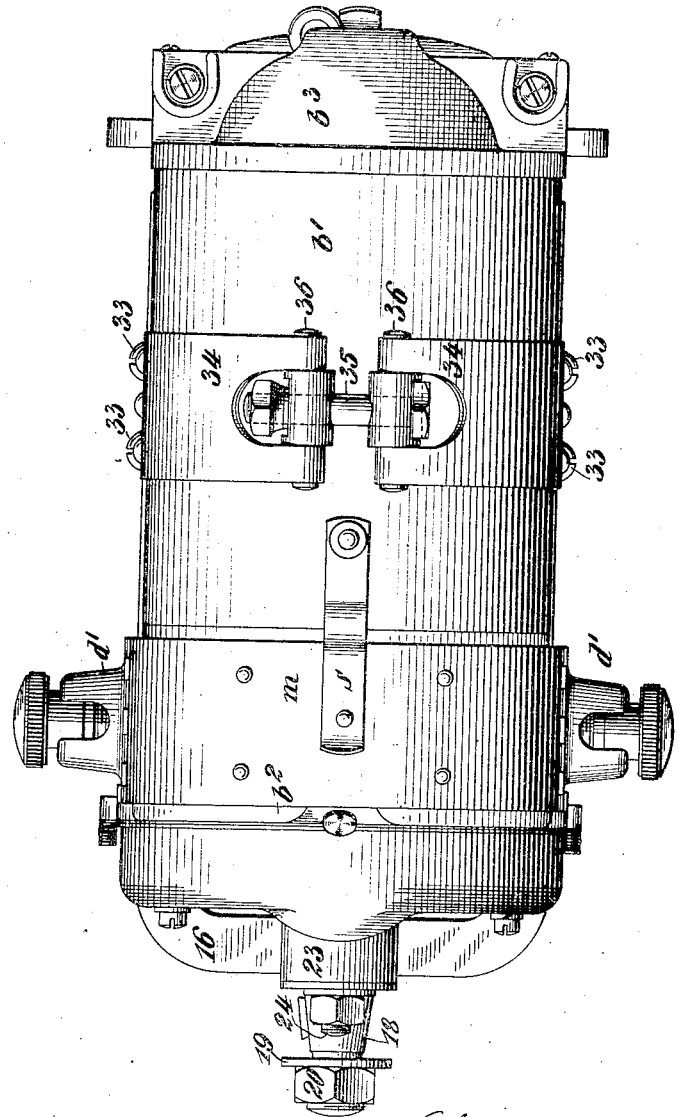

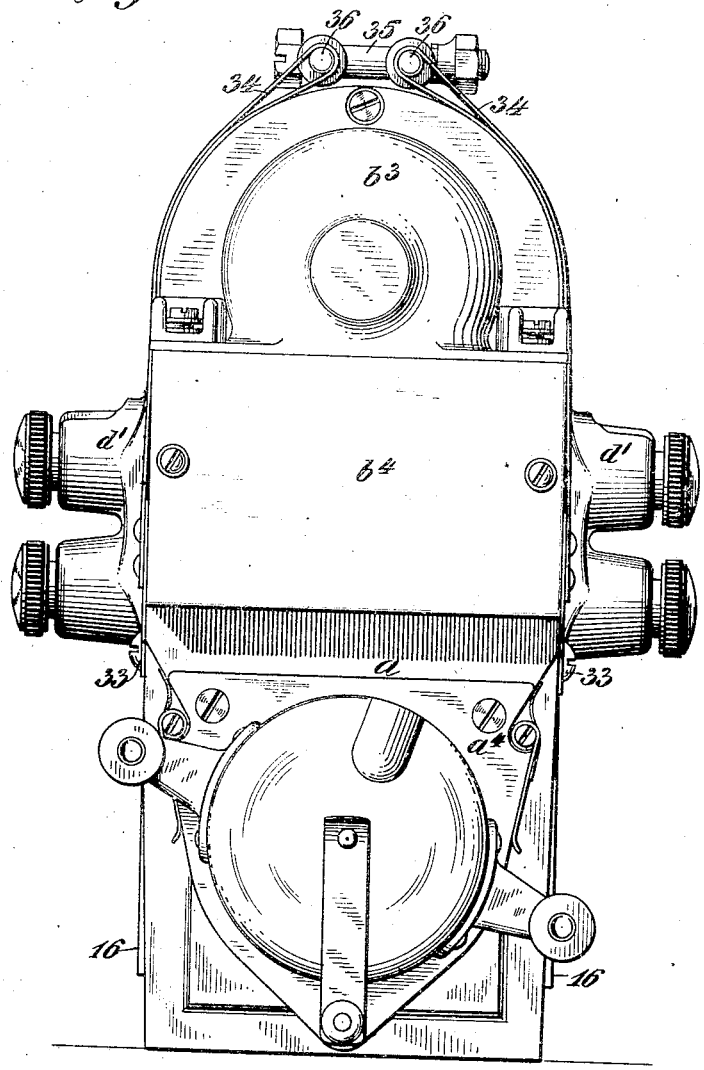

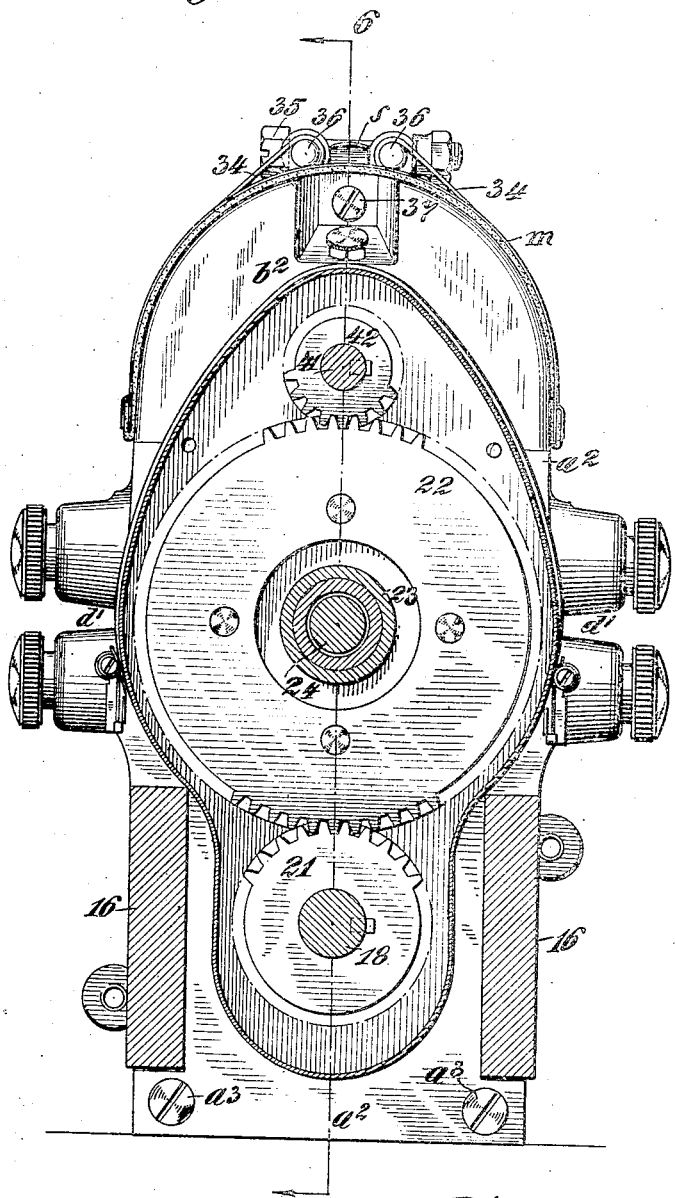

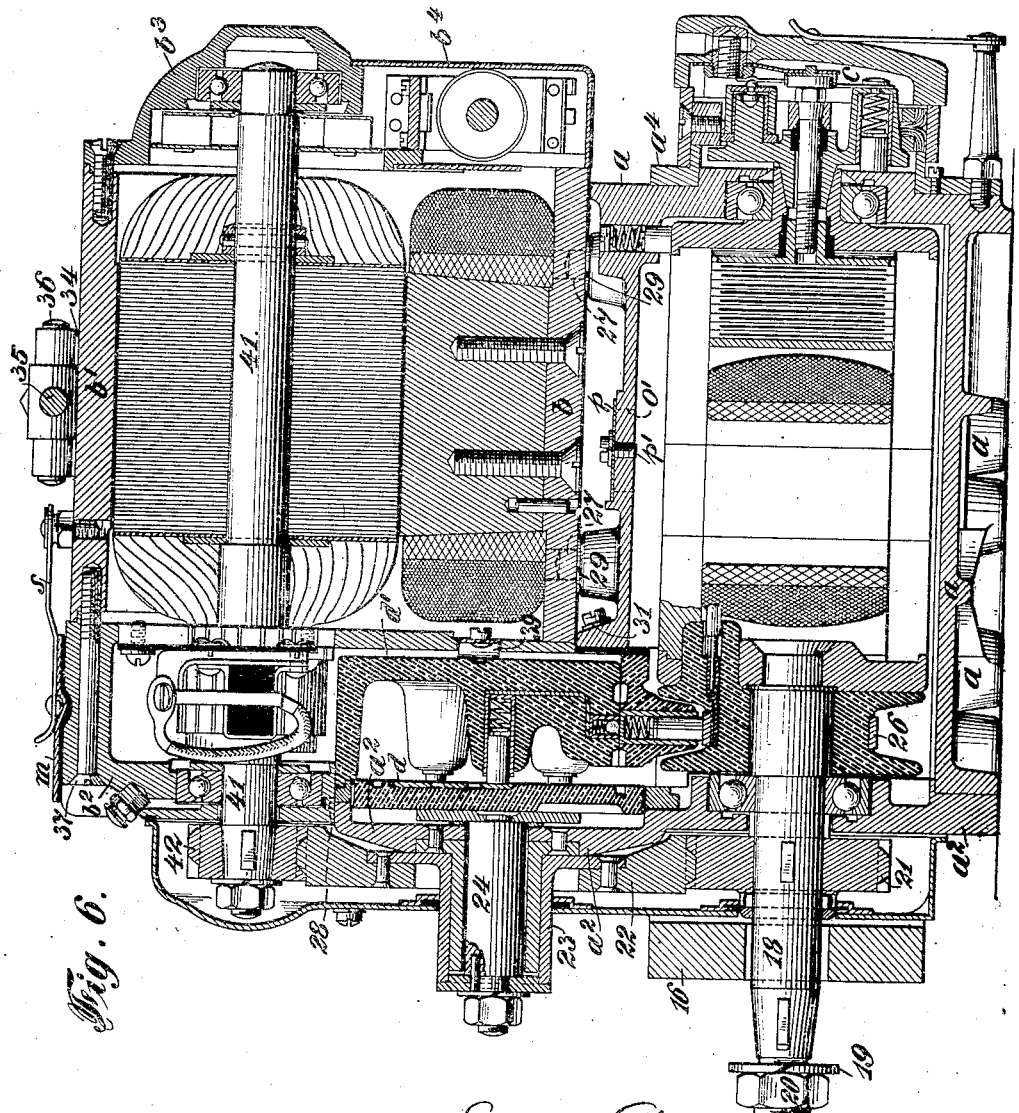

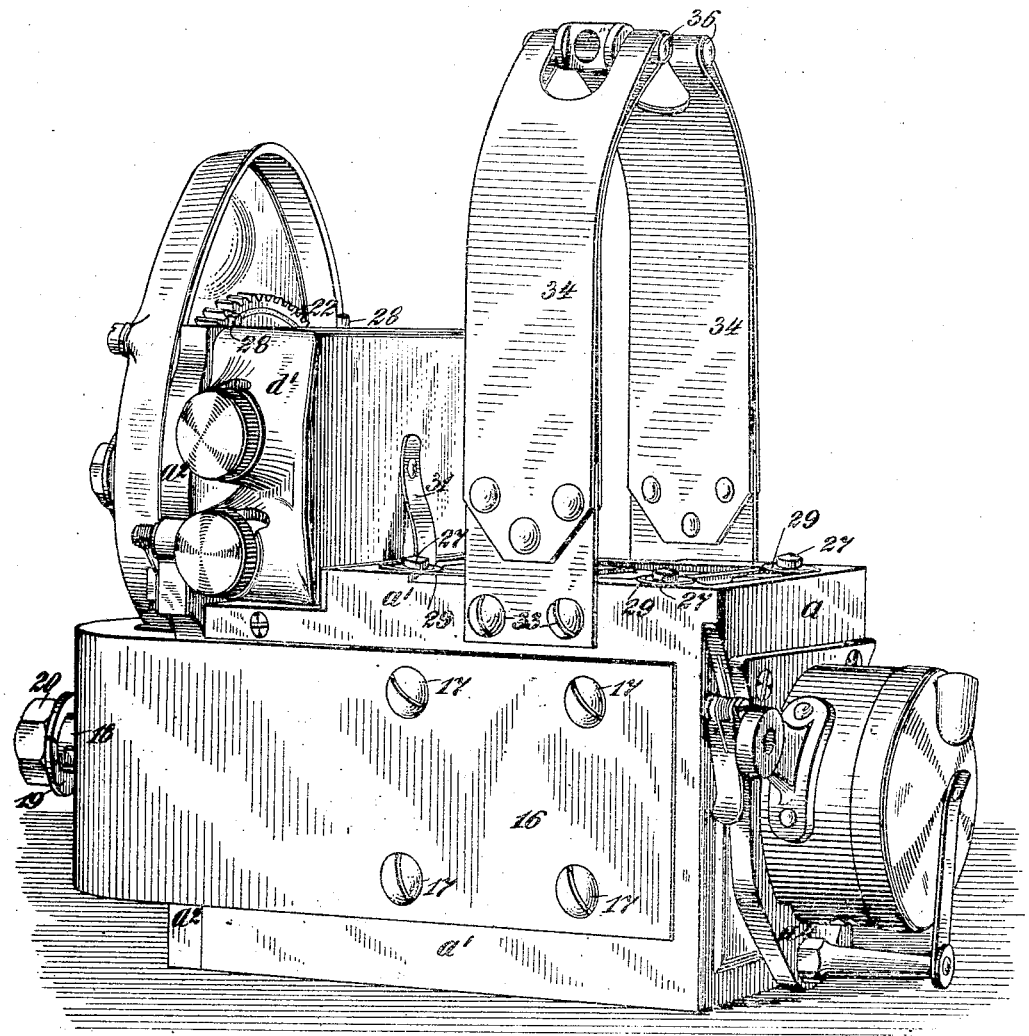

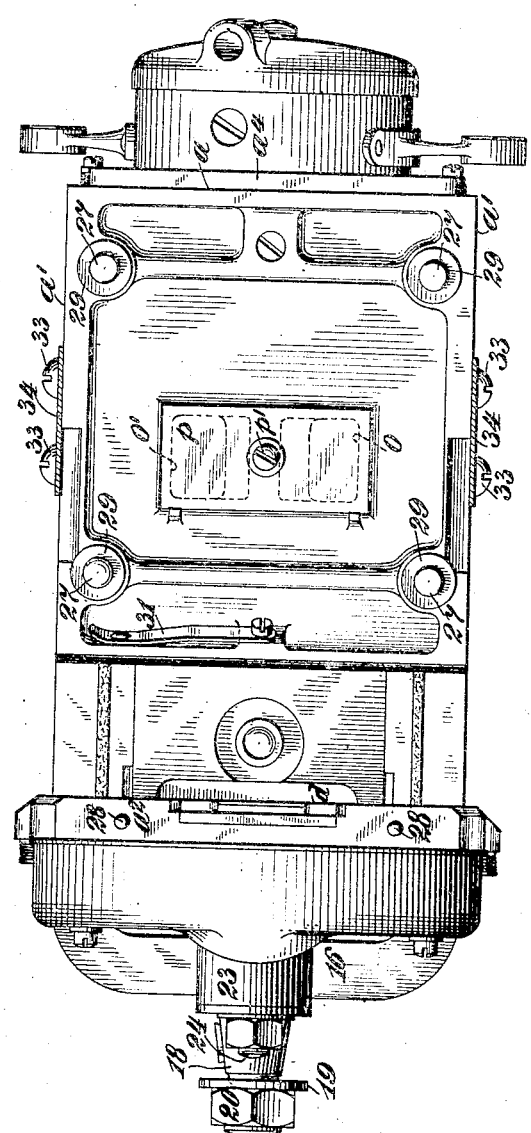

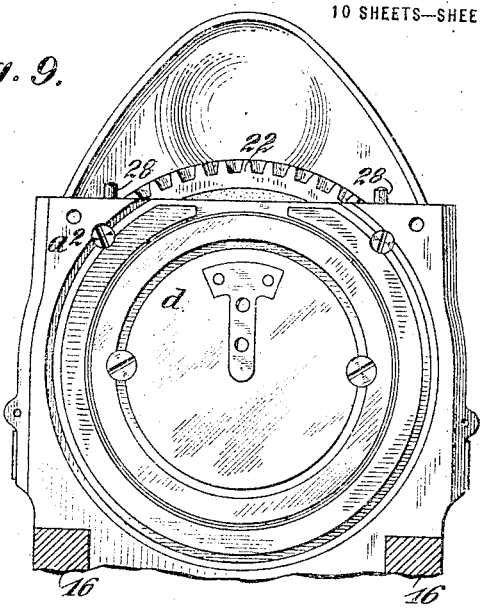
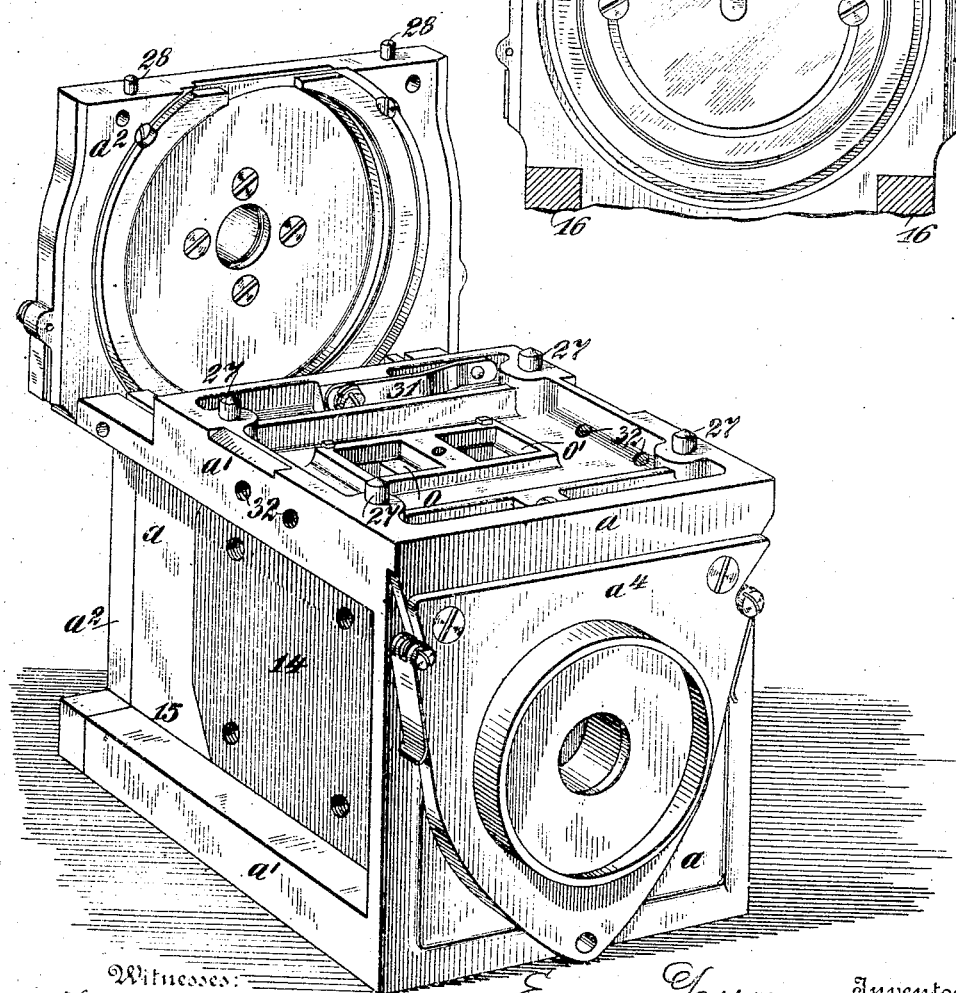

1,322,103.

Patented Nov. 18, 1919.
10 SHEETS—SHEET 10.

Witnesses:
Fred Korger
Louise Keller

Eugene Gassmann
Henry W. Uhl
Inventors

By Henry Schreiter their Attorney

UNITED STATES PATENT OFFICE.

EUGENE GASSMANN, OF VALLEY STREAM, AND HENRY W. UHL, OF FREEPORT, NEW YORK, ASSIGNORS, BY MESNE ASSIGNMENTS, TO EISEMANN MAGNETO CORPORATION, OF BROOKLYN, NEW YORK, A CORPORATION OF NEW YORK.

MAGNETO-ELECTRIC MACHINE.

1,322,103.            Specification of Letters Patent.      Patented Nov. 18, 1919.

Application filed July 23, 1918. Serial No. 246,300.

*To all whom it may concern:*

Be it known that we, EUGENE GASSMANN, a citizen of Germany, and resident of Valley Stream, county of Nassau, and State of New York, and HENRY W. UHL, a citizen of the United States, and resident of Freeport, county of Nassau, and State of New York, have invented certain new and useful Improvements in Magneto-Electric Machines, of which the following is a full, clear, and exact specification.

Our invention relates to machines used on motor boats, road vehicles, aeroplanes, etc., for producing electric currents for ignition of the explosive charges in internal combustion engines, and also for lighting, and consists in devising a combined magneto electric machine, wherein (1) The component units of the machine are arranged each complete with its accessories in a casing totally separable from that in which the other unit is housed, so that each unit is separable from the other by merely removing the casing, wherein it, and its accessories, are inclosed, and so that the unit generating the ignition current is capable of independent operation, when the unit generating the lighting current is removed; wherein (2) The stationary part of the distributer is separable from the rotatory part thereof, a recess being provided therefor between the casings, thus enabling this part of the distributer to be removed for inspection, or repair, without necessitating the dismounting of any other part of the machine; means being also provided for securing this part of the distributer in its requisite position relatively to the other parts of the unit producing the ignition current, when the casing containing the unit generating the lighting current is removed, and wherein (3) The distributer gear is made to serve also for the transmission of the rotatory motion from the magneto shaft to the shaft of the dynamo, or vice versa, the location of the distributer relatively to the electric current generating units being thus utilized, and the gears on the shafts of the current generating units and the distributer gear being so proportioned relatively to each other, and with due consideration of the requirements of each, that the requisite ratio of rotation of the rotatory part of the distributer relatively to the speed of the armature (or other rotatory part) of the magneto is obtained, and also the driving of the armature of the dynamo at a speed required to generate lighting current of sufficient voltage is secured.

Furthermore, means are provided in the construction of the casings, housing the component units of our magneto electric machine, for adjusting the relative positions of the units and for magnetically insulating their fields from each other.

A machine constructed according to our invention is illustrated in the accompanying drawings, wherein—

Figure 1 is a perspective view of the complete machine assembled;

Fig. 2 is a side elevation thereof with the stationary part of the distributer removed;

Fig. 3 is a top view, and

Fig. 4 a rear elevation of the complete machine;

Fig. 5 is a front elevation of the complete machine, the wall of the casing and part of the magnet of the magneto unit being omitted to disclose the location and arrangement of the driving gears; and Fig. 6 is a longitudinal sectional view of the complete machine on line 6—6, indicated in Fig. 5;

Fig. 7 is a perspective view, (looking from the rear) of the magneto as it is when the dynamo is removed; the bands for securing the dynamo casing thereon being shown;

Fig. 8 is a top view thereof, the stationary part of the distributer being omitted, and the bands for securing thereon the dynamo being broken off in this figure, to prevent obstructing the view of the parts;

Fig. 9 is a fractional view, a rear elevation of the extended front part of the magneto casing with the rotatory part of the distributer and the distributer gear set in their positions.

Figure 11:
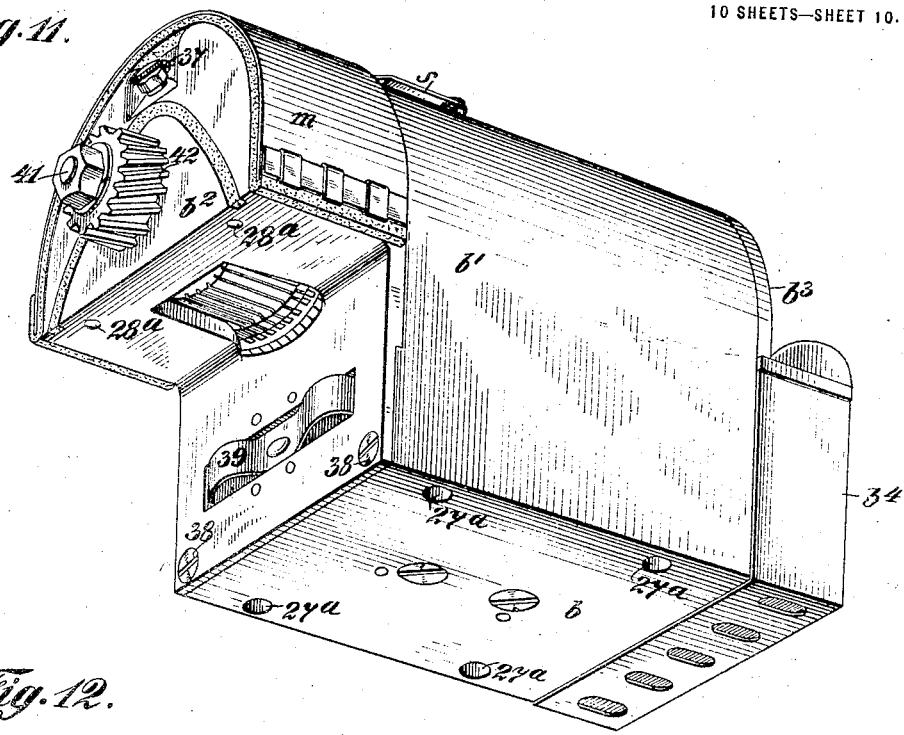

Fig. 10 is a perspective view of the skeleton casing for the housing of the parts of the magneto unit;

Fig. 11 a perspective view of the dynamo, and

Figure 12:
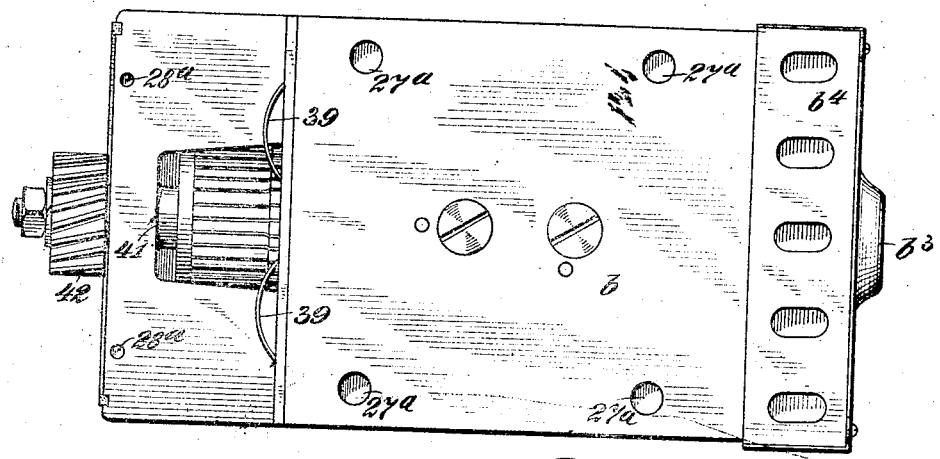

Fig. 12 a bottom view thereof.

The magneto unit, whereon the dynamo unit is superimposed, is illustrated by itself in Figs. 7 to 10. The last figure illustrates the casing for the magneto. This casing is cast in two parts, the body $a$ and front end wall $a^2$, of aluminum, or of some other non-magnetic metal. In casting the body $a$ of the casing, the pole-shoes 14 are embedded therein so as to have their outer surfaces flush with the recessed side walls as shown in Fig. 10. The legs of the horizontally arranged permanent magnet 16 are fitted into the recesses 15, formed in the side walls of the body $a$ of the casing as explained, and the pole-shoes 14 are secured thereto by the screws 17, as shown in Fig. 7, illustrating the complete magneto unit in a perspective view.

Also the top and bottom plates of the magneto casing and the front wall $a^2$ are suitably shaped exteriorly, and the interior of the body of the casing is turned to fit the rotatory part of the magneto. The front end wall $a^2$ is extended upward, and shaped for mounting the rotatory part of the distributer therein. The lower portion of the front end wall $a^2$ is fitted upon the body $a$ of the magneto casing and is secured thereto by screws $a^3$. Thus, the armature of the magneto, and the collector ring 26, may be set in, into the interior of the casing $a$ when the machine is being assembled, for which purpose also the front and rear end walls of the casing are centrally perforated to admit passing therethrough of the armature shaft. The rear end wall may be supplemented by a plate $a^4$ (see Fig. 10) to facilitate the mounting of the circuit breaker $c$ on the end of the armature shaft.

The apex of the magnet 16 is perforated, and the shaft 18 of the armature of the magneto is extended therethrough for a distance sufficient to have a gear keyed thereto, or other means, for driving the magneto from the shaft of the engine. The washer 19 and nut 20, threaded onto the end of the shaft 18, serve to secure thereto the above-mentioned driving gear (not shown in the drawing). The gear 21 is keyed to the armature shaft 18 inside of the arch of the magnet 16, and meshes with the distributer gear 22, secured to the sleeve 23, fixed to the shaft 24, whereon the rotatory part $d$ of the distributer is mounted.

The formation of the upper, or top side of the casing $a$ is illustrated in Figs. 8 and 10. The pins 27 set therein, and the pins 28, set in the top of the extension of the front wall $a^2$ serve to fix the casing of the dynamo unit, wherein corresponding bores 27$^a$ and 28$^a$ are made, upon the casing of the magneto unit to obtain the requisite alinement of the parts, and of the driving gears. These pins are made preferably of steel and are magnetically insulated by the non-magnetic metal of the casings wherein they are set, and into which they enter when the casings are set together. The thin washers 29, set on the pins 27 serve for exactly adjusting the vertical position of the dynamo casing as required for an efficient co-action of the driving gears. The rectangular openings $o$ and $o'$ in the top side of the magneto casing are made to facilitate inspection of the armature wiring, etc., and the plate $p$, set thereon and fastened by the screw $p'$ is provided to close these openings. The spring 31 shown in Figs. 8 and 10, laid within the recessed part of the top plate of the magneto casing serves for holding the stationary part $d'$ of the distributer against the rotatory part as shown in Fig. 7, when the dynamo unit is removed.

The casing of the dynamo unit is illustrated in Figs. 6, 11 and 12. It is made up of four parts, the bottom plate $b$, side walls and top, $b^1$, composing the dome-shaped central body of the casing, the front wall $b^2$, and the rear wall $b^3$, supplemented by the part $b^4$, joining it with the bottom plate $b$, to complete the inclosure within of the component parts of the dynamo and of its accessories. The front wall $b^2$ forms an arched extension of the upper part of the dome-shaped central body of the casing, and overtops the stationary part $d'$ of the distributer and the extension $a^2$ of the front wall of the magneto casing. It is secured to the central body of the dynamo casing by the screw 37 (see Figs. 5 and 6), joining it to the arched top of the central body $b^1$, and by the screws 38 (see Fig. 11), joining it to the bottom plate $b$ of the dynamo casing. The front wall $b^2$ is centrally perforated for the installation therein of a ball bearing for one end of the armature shaft 41 of the dynamo, a corresponding bearing being provided in the rear wall $b^3$ for the other end of the said shaft. The gear 42 is fixed on the end of this shaft, projecting beyond the front wall $b^2$ of the dynamo casing. This gear 42 meshes with, and is driven by, the distributer gear 22, whereby the armature of the dynamo is driven.

The bores 28$^a$ in the front wall $b^2$ correspond in their positions to the positions of the pins 28, set in the extension $a^2$ of the front wall of the magneto casing (see Fig. 10) and the bores 27$^a$, in the bottom plate $b$, are situated correspondingly to the positions of the pins 27 set in the top of the casing of the magneto unit. When the casing containing the dynamo is set upon the casing housing the magneto, the pins 27 and 28 enter into the bores 27$^a$, and 28$^a$, thus fixing the units in their relative positions to each other. The screw-threaded bores 32 in the side walls $a'$ of the magneto casing are provided for affixing thereto, by the screws 33, of the bands 34, whereby the dynamo unit is secured to the magneto unit. The ends of the bands 34 are joined together by the bolt 35, passing through the bores in the enlarged central portions of the studs 36, inserted in the folds of the said bands.

To protect the electrical connections from wetting, etc., it is desirable, in fact necessary, to apply over the arched part of the front wall $b^2$ of the dynamo casing the leather lined metallic strip $m$. The spring $s$ holds the strip $m$ in its place and affords a ready access to the connections of the dynamo when an inspection thereof is required.

The stationary part $d'$ of the distributer, the part of the machine requiring most frequently to be inspected, is removable *in toto*, being slid in, into the space (see Figs. 2 and 6) between the frame of the rotatory part $d$ of the distributer, mounted in the extension of the front wall $a^2$ of the magneto casing, and the front wall $b^2$ of the dynamo casing. The spring 39, fixed in the lower portion of the front wall $b^2$ is provided to engage the stationary part $d'$ of the distributer, when thus set in its place, the spring 39 being set to press it against the frame of the rotatory part $d$. When the dynamo is removed from the machine, the spring 31, turnably secured to the top of the magneto casing (see Figs. 8 and 10) is set up as shown in Fig. 7, to perform this function.

The gears 21, 22 and 42, are shown in front view in Fig. 5, and in a sectional view in Fig. 6. To enable the distributer gear to be utilized as a transmission gear for the driving of the dynamo, the relative size of the gears 21 and 22 is determined to effect the driving of the rotatory part of the distributer at a speed correctly proportionate to the speed of the magneto and according to the number of cylinders in the engine, and then the size of the gear 42 is determined to drive the dynamo at the requisite speed to generate lighting current of a voltage amply sufficient for the purpose.

Nothing in the construction of the component parts of the magneto, the dynamo, the circuit breaker, and of the distributer, being claimed as our invention, detailed description of these parts is omitted, reference being made thereto only as necessary for explaining the construction and arrangement of the units of the machine and of the means for combining them as recited in the introductory part of these specifications.

We claim as our invention:

1. A magneto electric machine, comprising a magneto unit, a distributer and a dynamo unit, means for driving the rotatory part of the magneto unit, a gear on the rotatory part of the magneto, a gear on the rotatory part of the dynamo, and a gear on the rotatory part of the distributer, the gear on the rotatory part of the distributer meshing with the gears on the rotatory parts of the magneto and of the dynamo, and the gears being proportioned to drive the rotatory part of the distributer at a speed suitably proportionate to the speed of the magneto, and the rotatory part of the dynamo unit at a speed required to generate a lighting current of sufficient voltage for the purpose; substantially as herein shown and described.

2. The combination in a magneto electric machine of a magneto unit, a distributer, a dynamo unit and a driving gear, comprising a gear on the rotatory part of the magneto, a gear on the rotatory part of the distributer meshing therewith, and a gear on the rotatory part of the dynamo meshing with the distributer gear, and of means for driving the rotatory part of the magneto; substantially as herein shown and described.

3. In a magneto electric machine the combination with a magneto unit, a distributer, a dynamo unit, and with means for driving the rotatory part of a magneto unit, of a gear fixed thereon, a gear on the rotatory part of the distributer, meshing therewith, and proportioned to drive the rotatory part of the distributer at a speed suitably proportionate to the speed of the magneto; and of a gear on the rotatory part of the dynamo, meshing with the distributer gear, and proportioned to drive the rotatory part of the dynamo unit at a speed required to generate a lighting current of sufficient voltage for the purpose; substantially as herein shown and described.

4. A magneto electric machine, comprising a magneto unit, a high tension current distributer, a dynamo unit and gears for driving the distributer and the dynamo from the shaft of the magneto, a casing wherein the magneto unit, the rotatory part of the distributer and the gears on the rotatory part of the magneto unit, and on the rotatory part of the distributer meshing therewith, are housed, a second casing wherein the dynamo unit, and a gear on its rotatory part, are housed, the said casings being fitted together so the gear on the dynamo unit is brought in mesh with the gear on the rotatory part of the distributer when the casing, containing the dynamo unit, is set upon that containing the magneto unit; means for securing the casings together, means for holding the stationary part of the distributer in its position, and means for driving a rotatory part of the magneto unit; substantially as herein shown and described.

5. In a magneto electric machine, the combination with a magneto unit, a high tension current distributer, a dynamo unit, the driving gears therefor, and a casing composed of two parts, wherein the units and gears are housed, one unit in each part, of means on the part of the casing, wherein the magneto unit, the rotatory part of the distributer, and their driving gears are housed for holding the stationary part of the distributer in its position when the other part of the casing, containing the dynamo unit is removed; substantially as herein shown and described.

6. In a magneto electric machine, the combination with a magneto unit, a high tension current distributer, a dynamo unit, the driving gears therefor, and a casing composed of two parts, wherein the units and gears are housed, one unit in each part, of a spring turnably secured to the part of the casing, wherein the magneto unit, the rotatory part of the distributer, and their driving gears are housed, and adapted to be set up to hold the stationary part of the distributer in its position when the other part of the casing, containing the dynamo unit, is removed; substantially as herein shown and described.

7. In a magneto electric machine the combination with a magneto unit, a high tension current distributer, a dynamo unit, and gears for driving the distributer and the dynamo from the shaft of the magneto, of a divisible casing comprising one part constituting a housing for the magneto unit, the rotatory part of the high tension current distributer, the gear thereon, and the gear on the rotatory part of the magneto unit meshing therewith, and one part constituting a housing for the dynamo unit and the gear fixed on its rotatory part, the two parts of the casing being fitted together, and forming, when joined, a recess adjoining the rotatory part of the distributer, adapted to hold the stationary part of the distributer, and means for securing the parts of the casing together; substantially as herein shown and described.

8. In a magneto electric machine the combination with a magneto unit, a high tension current distributer, a dynamo unit and gears for driving the distributer and the dynamo from the shaft of the magneto, of a divisible casing comprising one part constituting a housing for the magneto unit, the rotatory part of the high tension current distributer, the gear thereon, and the gear on the rotatory part of the magneto unit meshing therewith, and one part constituting a housing for the dynamo unit and the gear fixed on its rotatory part, the two parts of the casing being fitted together, and forming, when joined, a recess adjoining the rotatory part of the distributer, the recess being adapted to hold the stationary part of the distributer, a spring set on the part of the casing containing the dynamo unit to project into the recess, and means for securing the parts of the casing together; substantially as herein shown and described.

EUGENE GASSMANN.
HENRY W. UHL.

Witnesses:
CHARLES S. SKINNER,
LOUISE KELLER.